United States Patent [19]

Nishi et al.

[11] Patent Number: 4,539,823
[45] Date of Patent: Sep. 10, 1985

[54] REFRIGERATION SYSTEM

[75] Inventors: Yasuyuki Nishi; Masao Sakurai, both of Oobu; Masashi Takagi, Kariya, all of Japan

[73] Assignee: Nippondenso Co., Ltd., Kariya, Japan

[21] Appl. No.: 614,713

[22] Filed: May 29, 1984

Related U.S. Application Data

[62] Division of Ser. No. 359,985, Mar. 19, 1982, abandoned.

[30] Foreign Application Priority Data

| Mar. 27, 1981 | [JP] | Japan | 56-45950 |
| Apr. 3, 1981 | [JP] | Japan | 56-50741 |
| Apr. 13, 1981 | [JP] | Japan | 56-55265 |
| May 22, 1981 | [JP] | Japan | 56-78410 |

[51] Int. Cl.³ ............................ F25B 1/00; B60H 3/04
[52] U.S. Cl. .................................. 62/228.5; 62/229; 62/243; 165/43
[58] Field of Search ................ 62/229, 227, 228.5, 62/228.3, 133, 239, 209, 215, 226, 196.2, 243, 244; 165/41, 42, 43; 236/1 EA, 13, 91 F, 91 C; 98/2.01, 2.11

[56] References Cited

U.S. PATENT DOCUMENTS

| 2,304,999 | 12/1942 | Gonzalez | 62/229 |
| 2,401,827 | 6/1946 | Heitchue | 62/196.2 X |
| 2,556,882 | 6/1951 | Minkler et al. | 62/228.5 X |
| 2,920,812 | 1/1960 | Courtney, Jr. | 62/228.5 X |
| 3,121,314 | 2/1964 | Koyanagi | 62/133 |
| 3,491,546 | 1/1970 | Holzer | 62/227 X |
| 3,495,418 | 2/1970 | Kapich | 62/228.5 X |
| 3,771,318 | 4/1973 | Roberts | 62/323.4 |
| 4,065,229 | 12/1977 | Black | |
| 4,068,981 | 1/1978 | Mandy | 417/310 |
| 4,132,086 | 1/1979 | Kountz | 62/228.5 X |
| 4,152,902 | 5/1979 | Lush | 236/1 EA |
| 4,206,613 | 6/1980 | Shockley | 62/133 |
| 4,289,272 | 9/1981 | Murase et al. | 236/91 D |
| 4,342,199 | 8/1982 | Shaw et al. | 417/310 X |
| 4,351,160 | 9/1982 | Kountz et al. | 62/209 X |
| 4,354,547 | 10/1982 | Sugiura | 62/164 X |
| 4,356,705 | 11/1982 | Sutoh et al. | 62/229 |

FOREIGN PATENT DOCUMENTS 0028453 5/1981 European Pat. Off. .

Primary Examiner—Harry Tanner
Attorney, Agent, or Firm—Cushman, Darby & Cushman

[57] ABSTRACT

An automotive air conditioner has an air duct in which a refrigerant evaporator of a refrigeration cycle is disposed in fluid-flow communication with a variable capacity refrigerant compressor driven by an automotive engine and provided with compressor displacement varying members. A blower is provided to cause air to flow through the evaporator and through the duct into the passenger compartment. A sensor is provided to detect a condition representing the cooling operation of the evaporator, such as the air temperature downstream of the evaporator, surface temperature thereof or the pressure of the refrigerant at the evaporator. An electric controlling circuit is operative in response to signals from the sensor to actuate a servo motor which in turn drives the compressor displacement varying members whereby the capacity of the compressor is varied in accordance with the condition detected by the sensor.

13 Claims, 22 Drawing Figures

REFRIGERATION SYSTEM

This is a division of application Ser. No. 359,985, filed Mar. 19, 1982 abandoned upon the filing hereof.

BACKGROUND OF THE INVENTION

The present invention relates to a refrigeration system suited for use in, but not exclusively, an automotive air conditioning system and, more particularly, to a capacity control of such a refrigeration system.

DESCRIPTION OF THE PRIOR ART

Figure 1:
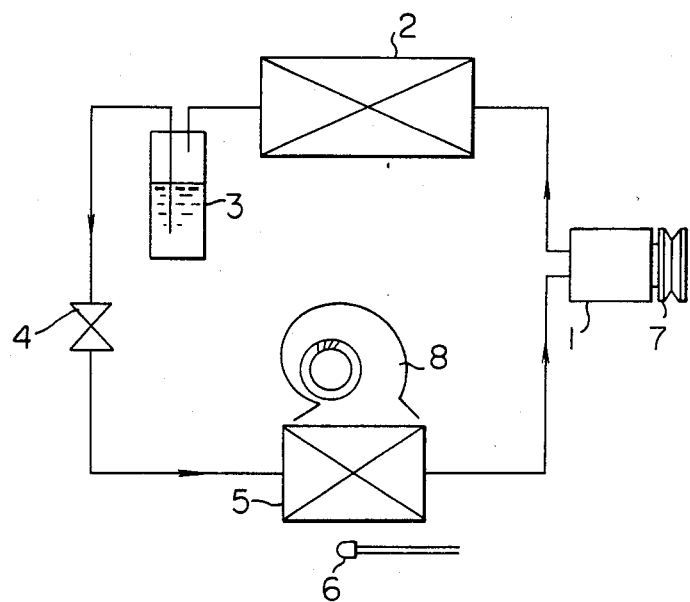
FIG. 1 is a block diagram of the refrigeration cycle of the prior art automotive air conditioner.

As will be seen from FIG. 1, a typical conventional automotive air conditioning system employs a vapor compression type refrigeration cycle consisting essentially of a compressor 1, a condenser 2, a receiver 3, an expansion valve 4 and an evaporator 5. Since the compressor 1 is driven by the automobile engine (not shown) through an electromagnetic clutch 7, the operation speed of the compressor is naturally increased as the engine speed becomes higher. In this conventional air conditioning system, it is often experienced that a frosting or icing takes place on the fins of the evaporator 5, as the surface temperature of the evaporator fins and thus the evaporation temperature of the refrigerant comes down below 0° C. due either to the increase in the operation speed of the compressor or to the reduction in the ambient air temperature. The frosting or icing on the fins reduces the rate of the air flow from a blower 8 through the evaporator 5, resulting in a reduction in the air cooling capacity.

Figure 2:
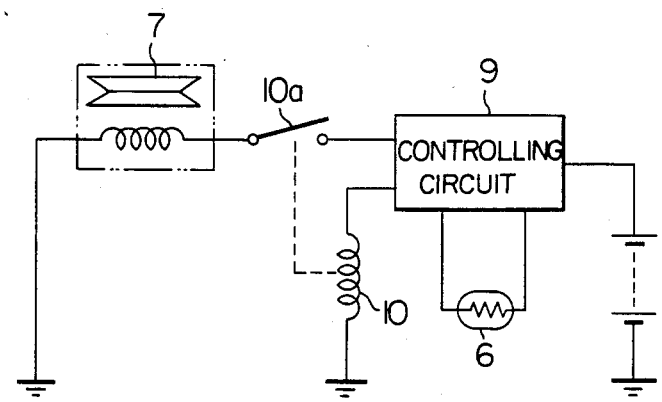
FIG. 2 is an electrical block diagram illustrating a capacity control system of the prior art refrigeration cycle shown in FIG. 1.

In order to prevent the frosting or icing on the evaporator fins or to control the air temperature in the automobile, therefore, the temperature of air just downstream of the evaporator 5 is detected by a temperature detector 6 such as a thermistor which is electrically connected to a control circuit 9 shown in FIG. 2 so that a relay 10 is controlled in accordance with the output from the temperature detector to open and close a contact 10a to engage or disengage the electromagnetic clutch 7, whereby the period of operation of the compressor is controlled to adjust the evaporation temperature of the refrigerant, thereby to control the air temperature immediately downstream of the evaporator.

Figure 3:
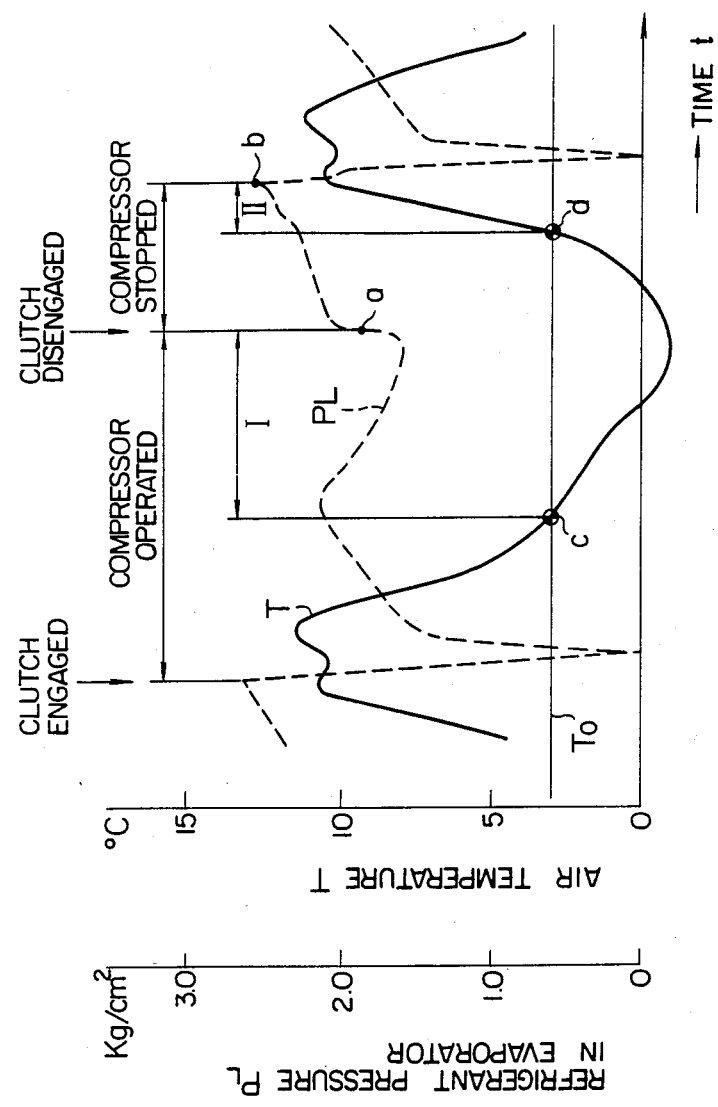
FIG. 3 graphically illustrates variations in the refrigerant pressure in evaporator and in the air pressure immediately downstream of the evaporator, as obtained by the prior art capacity control system.

This arrangement, however, has the following drawback. Namely, when the cooling load is decreased or the operation speed of the compressor 1 is increased, the capacity of the compressor 1 and thus of the refrigeration cycle exceeds the cooling load or demand. In such a case, the air temperature T just downstream of the evaporator 5 is lowered and comes down below a set temperature To at a point (c), as shown in FIG. 3. However, a considerably long time period represented by I in FIG. 3 is required until the control circuit 9 is put into effect due to a large heat capacity of the temperature detector 6. In consequence, the air temperature T is further lowered for the time period I until a moment (a) at which the control circuit 9 starts to operate is reached. Thus, the air temperature is lowered to a level considerably lower than the set temperature To. The control circuit 9 starts to operate at the moment (a) to disengage the clutch 7 so that the compressor 1 stops. Then the expansion valve 4 is closed to stop the supply of the refrigerant to the evaporator 5. In consequence, the intenal pressure $P_L$ in the evaporator 5 is raised to increase the area of super heating of the refrigerant with a resultant decrease in the effective heat transfer area of the evaporator 5. As a result, the air temperature T just downstream of the evaporator 5 is increased drastically and comes to exceed the set temperature at a moment (d). The rise of the air temperature T, however, is continued undesirably to a moment (b) at which the control circuit 9 starts operation, due to the presence of a time period II attributable to the heat capacity of the temperature detector 6. The operation of the control circuit 9 is started at the moment (b) to again engage the clutch 7 thereby to start the compressor 1 again. The above-described operation is repeated to control the air temperature T.

This repetitional operation involves the following problems:

(1) During the operation of the compressor 1, the displacement of the compressor 1 exceeds the demand but, when the compressor 1 is not operating, there is a reduction in the cooling capacity due to an increase in the area of superheating in the evaporator 5 because of lack of the refrigerant. In consequence, power is consumed wastefully.

(2) The air temperature just downstream of the evaporator is varied widely due to the discontinuous operation of the compressor to give an unpleasant feeling of cooling to the users.

(3) The repeated engagement and disengagement of the clutch adversely affects the durability of the clutch.

(4) When the clutch is brought into the engaging state, a comparatively large load torque or shock is imparted to the engine to deteriorate the smoothness of the engine operation.

SUMMARY OF THE INVENTION

It is a primary object of the present invention to provide an improved refrigeration system which is entirely free from the above-discussed problems.

It is another object of the present invention to provide an air conditioning system in which the improved refrigeration system referred to above is incorporated.

The refrigeration system according to one feature of the present invention essentially comprises a variable capacity refrigerant compressor including means for varying the displacement of the compressor; an evaporator disposed in fluid-flow communication with the intake side of the compressor; sensor means operative to detect a condition related to the cooling operation of the evaporator; means for driving the compressor displacement varying means; and electric circuit means operative in response to a signal from the sensor means to actuate the driving means for thereby varying the displacement of the compressor whereby the capacity of the refrigeration system can be controlled.

The refrigeration system may further include means for causing air flow in heat exchange relationship with the refrigerant in the evaporator. The sensor means may comprise a temperature sensor for detecting a temperature related to the cooling operation of the evaporator, such as the air temperature immediately downstream of the evaporator and/or the temperature of the refrigerant as measured on the surface of the evaporator. The sensor means may alternatively comprise a pressure sensor for detecting the pressure of the refrigerant in or at the evaporator.

The refrigerant compressor used in the system of the invention may be of any conventional type. The refrigeration system of the invention may further include means for detecting the position of the compressor displacement means to thereby detect the corresponding displacement of the compressor. The output of the position detecting means may be fed back into the electric circuit means.

The refrigeration system of the invention may preferably be used in an automotive air conditioning system. In this case, the compressor may be driven by an automotive engine. An engine speed or r.p.m. may be detected by an r.p.m. sensor which emits an electric output to be fed into the electric circuit means.

The air conditioning system according to another feature of the present invention essentially comprises:
a duct defining therein an air passage having a downstream end open to a chamber to be air-conditioned, such as a passenger compartment of an automobile;
a refrigeration system including;
a variable capacity refrigerant compressor means for varying the displacement of the compressor; and an evaporator disposed in the air passage and being in fluid-flow communication with the intake side of the compressor;
means for causing air to flow through the evaporator and through the duct into the chamber;
a heater disposed in the duct downstream of the evaporator and being operative to heat at least a part of the air which has passed through the evaporator;
means for controlling the heating of the air by the heater; and
means for controlling the capacity of the compressor;
the capacity controlling means including;
sensor means operative to detect a condition related to the cooling operation of the evaporator;
means for detecting the position of the air heating controlling means; and
electric circuit means operative in response to signals from the sensor means and from the position detecting means to actuate the driving means for thereby varying the displacement of the compressor whereby the capacity of the refrigeration system can be controlled.

The sensor means may detect the air temperature downstream of the evaporator and/or the temperature of the surface of the evaporator. The sensor means may alternatively detect the pressure of the refrigerant at the evaporator. The means for controlling the heating of the air may preferably in the form of a valve means, such as a damper, operative to control the rate of the air flow from the evaporator to and through the heater. An additional position detecting means may be provided to detect the position of the valve means and thus the rate of air flow to and through the heater. The output of the additional position detecting means may be fed back into the electric circuit means.

The above and other objects, features and advantages of the present invention will be made apparent by the following description with reference to FIGS. 4 through 22 of the accompanying drawings.

DESCRIPTION OF PREFERRED EMBODIMENTS

The refrigeration systems embodying the present invention basically employ refrigeration cycles identical to the prior art refrigeration cycle discussed with reference to FIG. 1. Thus, the parts of the respective embodiments of the invention similar to those of the prior art refrigeration cycle are designated by the same reference numerals. Description of the refrigeration cycle itself is omitted accordingly.

Figure 4:
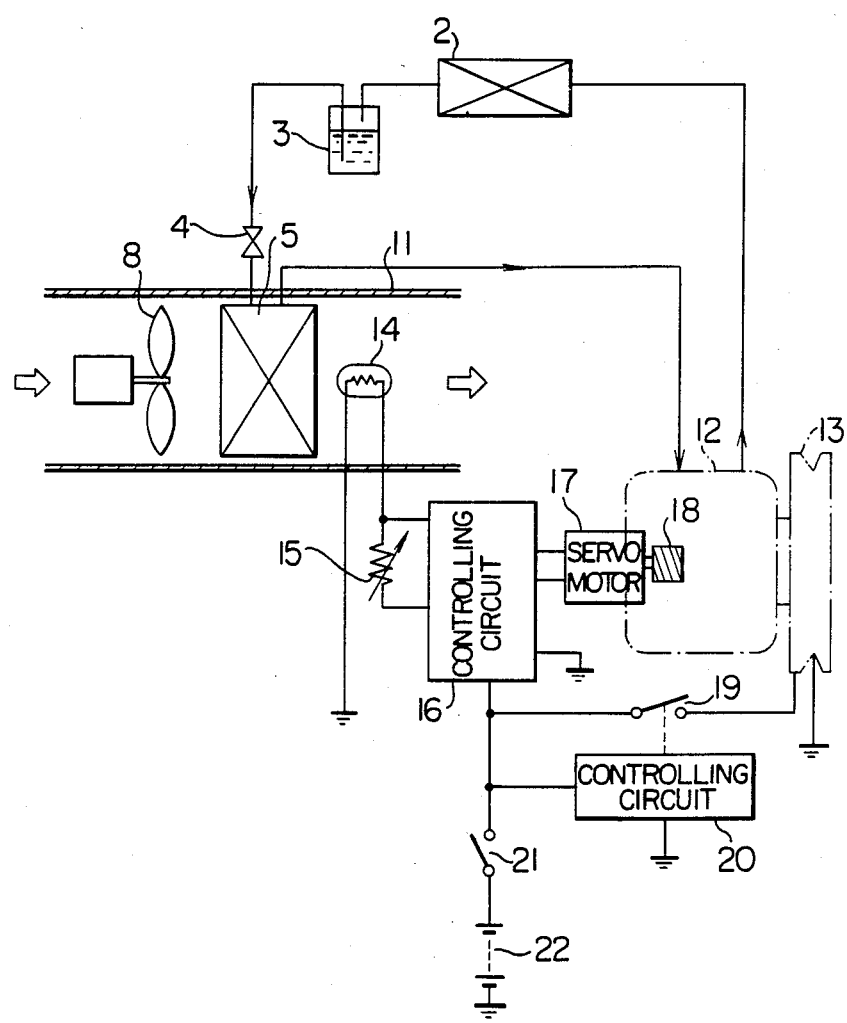
FIG. 4 is a diagrammatic illustration of an embodiment of the refrigeration system according to the present invention.

FIG. 4 shows the whole part of a first embodiment of the refrigeration system of the invention. The refrigeration system has an evaporator 5 and a motor-driven blower 8 disposed in a plastic duct 11 of an automotive air conditioner. The duct is communicated at its left-hand end with an ambient air intake opening and an internal air intake opening through a communication-switching box which is not shown. The duct is also communicated at its right-hand end with air outlets to the passenger compartment, such as upper air outlets for cooled air and lower air outlets for warmed air. A heater unit, not shown, is disposed in the duct 11. A compressor 12 is connected at its suction or intake side to the outlet end of a refrigerant pipe extending from the discharge port of the evaporator 5. The compressor 12 is adapted to be driven by the engine of the automobile through an electromagnetic clutch 13. As will be described later, this compressor 12 is of variable capacity or discharge type including displacement varying members for varying the capacity or displacement of the compressor. A temperature detector 14 consisting of a thermistor is adapted to detect the air temperature immediately downstream of the evaporator 5. The air temperature can be set by means of a variable resistor 15. The output signals of the temperature detector 14 and the variable resistor 15 are delivered to a control circuit 16 as its control input signals.

Reference numeral 17 designates a servo motor for driving the displacement varying members in the compressor 12. The servo motor 17 is adapted to be controlled in accordance with an output of the control circuit 16. The driving torque produced by the servo motor 15 is transmitted through a worm gear 18 to the displacement varying members of the compressor 12. Reference numeral 19 denotes a relay contact for switching on and off the electrical supply to the electromagnetic clutch 13 thereby to engage and disengage the compressor 12 with and from an autmotive engine, not shown. A control circuit 20 is adapted to detect the engine speed and ambient air temperature and to open the relay contact 19 upon detection of reduction in the compressor speed and the ambient air temperature. Reference numeral 21 designates a manipulation switch for turning the air conditioner on and off, while reference numeral 22 designates batteries mounted on the automobile.

Figure 5:
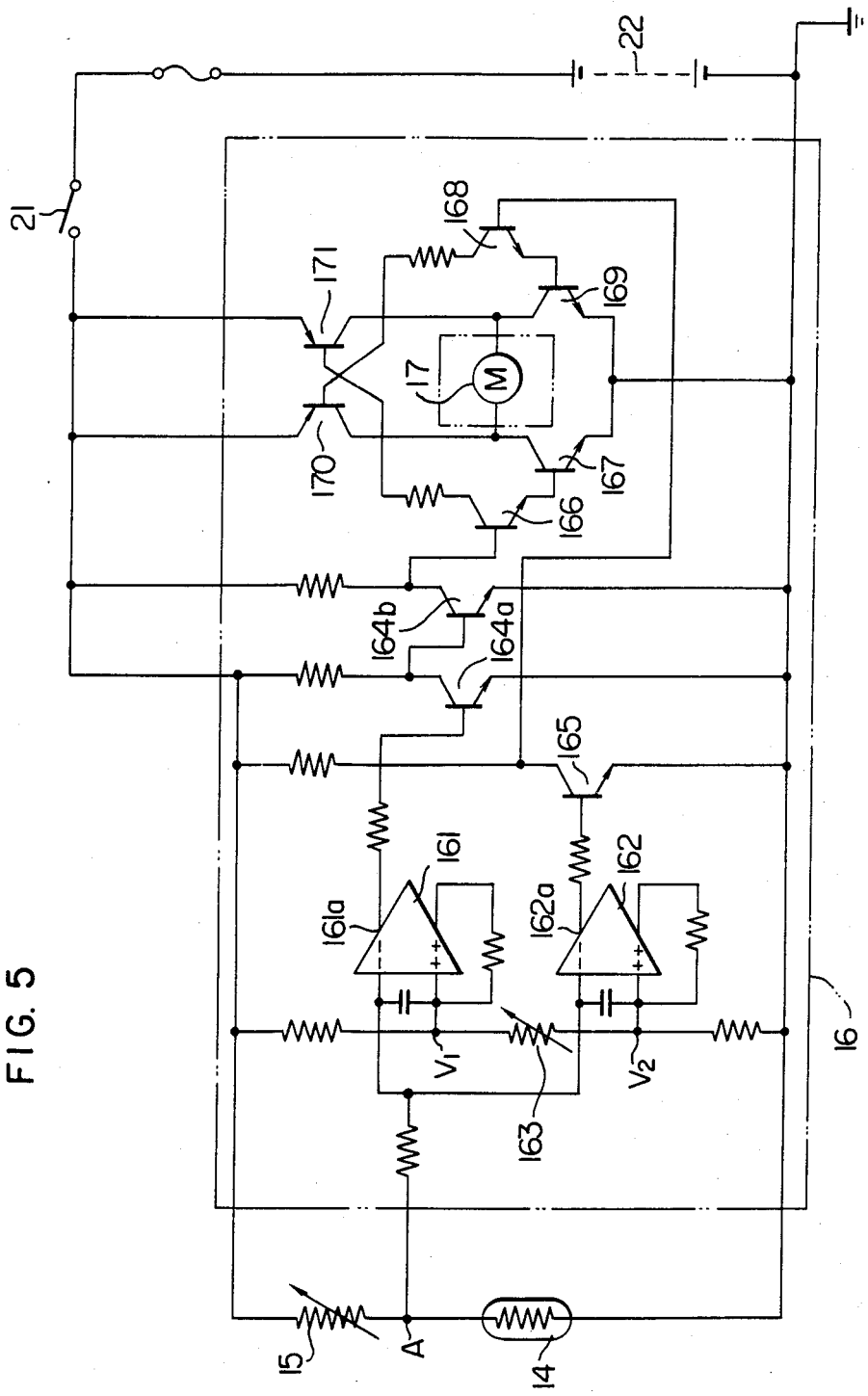
FIG. 5 shows an electric circuitry of the controlling circuit of the system shown in FIG. 4.

Referring now to FIG. 5, a practical example of the control circuit 16 includes a pair of comparators 161 and 162 each of which has an input terminal connected to a point of juncture A between the variable resistor 15 and the temperature detector 14. The first comparator 161 is adpated to receive at its other input terminal a reference voltage $v_1$ while the second comparator 162 receiver at its other input terminal a reference voltage $v_2$ which is lower than the reference voltage $v_1$ applied to the first comparator 161. The difference between two reference voltages $v_1$ and $v_2$ is adjustable by means of a variable resistor 163. The first comparator 161 has an output 161a which is electrically connected to switch transistors 164a and 164b on and off, while the second comparator 162 has an ouptut 162a which is electrically connected to switch a transistor 165 on and off. Reference numerals 166 to 171 denote transistors for driving the servo motor 17.

Figure 6:
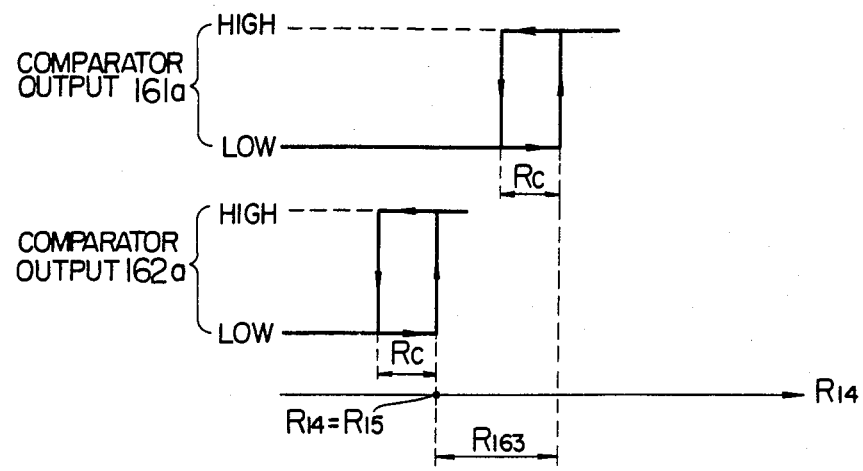
FIG. 6 illustrates the operation characteristics of the comparators of the electric circuitry shown in FIG. 5.

FIG. 6 shows the operation characteristics of the above-mentioned control circuit 16. The control circuit 16 is adapted to control the rotation of the servo motor shaft such that the resistance $R_{14}$ of the thermistor constituting the temperature detector 14 and the resistance $R_{15}$ of the variable resistor 15 for setting the air temperature are balanced (namely, $R_{14}=R_{15}$). When the resistance $R_{14}$ of the thermistor becomes greater than the resistance value $R_{15}$ of the variable resistor 15 by an amount $R_{163}$ which is set by the variable resistor 163, i.e., when the resistance $R_{14}$ becomes greater than the total of the resistances $R_{15}$ and $R_{16}$, the level of the output 161a is changed from "Low" to "High". To the contrary, when the resistance $R_{14}$ becomes smaller than the total of the resistances $R_{15}$ and $R_{163}$ by a predetermined constant value Rc, i.e., $R_{14}<(R_{15}+R_{163})-Rc$, the level of the output 161a is changed from the "High" level to the "Low" level.

On the other hand, the level of the output 162a of the second comparator 162 is changed from "Low" level to "High" level at the time when the resistance $R_{14}$ is equal to the resistance $R_{15}$. The level of the output 162a is changed from the "High" level to the "Low" level when the resistance $R_{14}$ is decreased to a value which is lower than the resistance $R_{15}$ by the constant value Rc, i.e., $R_{14}<R_{15}-Rc$. The value Rc is a constant value which is determined by the hysteresis characteristics of the first and second comparators 161 and 162.

An explanation will be made hereinunder as to the construction and operaton of the variable capacity type compressor 12.

Figure 7:
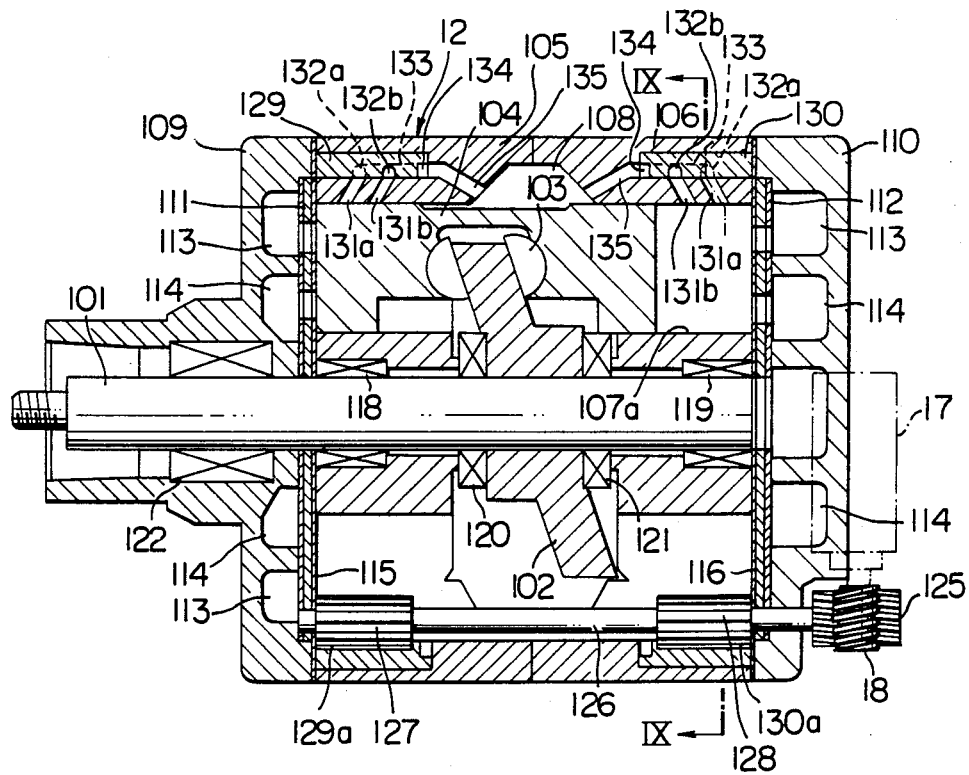
FIG. 7 is an axial sectional view of the compressor shown in FIG. 4 as taken along line VII—VII in FIG. 8.
Figure 9:
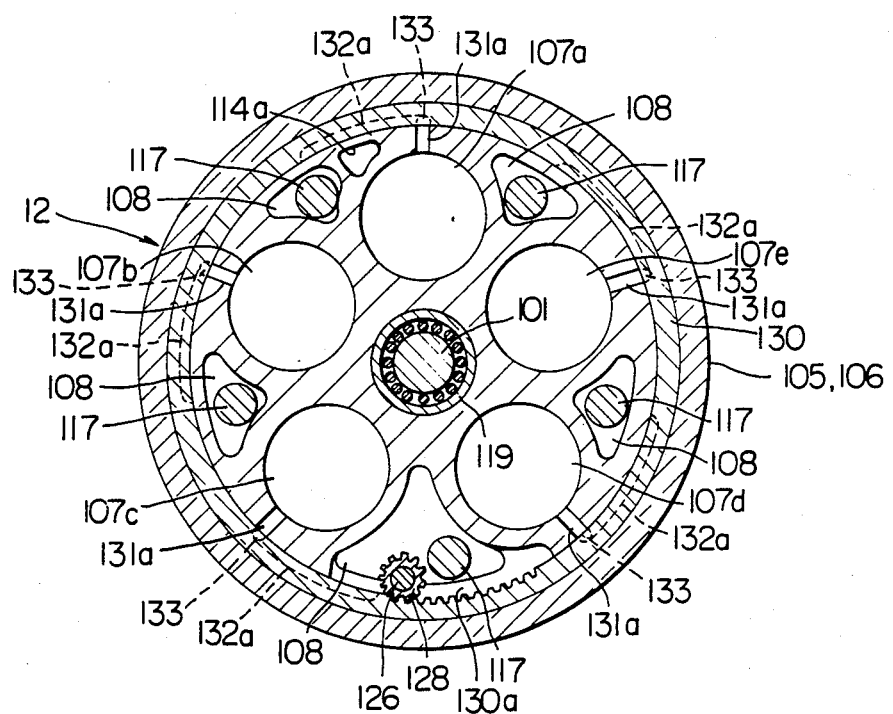
FIG. 9 is a cross-sectional view of the compressor as taken along line IX—IX in FIG. 7.
Figure 10:
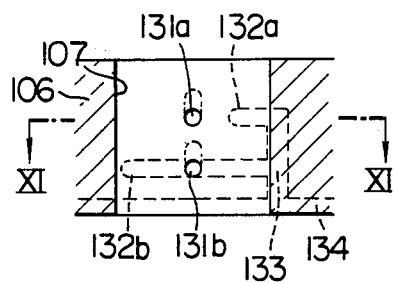
FIG. 10 is an enlarged fragmentary sectional view taken along line X—X in FIG. 11 and showing the positional relationship between the bypass grooves in the capacity or displacement varying ring shown in FIG. 9.
Figure 11:
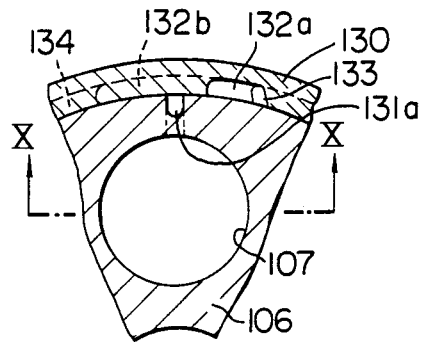
FIG. 11 is an enlarged fragmentary sectional view taken along line XI—XI in FIG. 10.

Referring to FIGS. 7 and 9, the compressor 12 has a shaft 101 drivingly connected at its left-hand end to the automobile engine through the electromagnetic clutch 13 shown in FIG. 4 and through a V belt which is not shown. Thus, the compressor 12 is driven by the power of the engine. A swash plate 102 is keyed to the shaft 101 so as to rotate as a unit with the shaft 101. The rotation of the swash plate 102 causes a reciprocating motion of pistons 104 (only one which is shown) which are in sliding contact with the swash plate 102 through shoes 103.

A pair of axially aligned housing members 105 and 106 are connected together to form a cylindrical housing which defines therein five cylinders 107a–107e for slidably receiving the pistons 104. Each of the housing members 105 and 106 is formed from aluminum or the like material by die-casting. There are five axial suction passages 108 formed in the housing members 105 and 106. As will be seen in FIGS. 8 and 9, the cylinders are circumferentially arranged at a constant angular pitch of 68° with the exception that the angular distance between the two lowermost cylinders 107c and 107d is 88°. Each suction passage 108 is disposed between pair of adjacent cylinders and is connected to a common refrigerant introduction passage (not shown) which is communicated with the outlet side of the refrigeration circuit in the evaporator 5.

End housing members 109 and 110 are disposed at the axially outer ends of the housing members 105 and 106 and secured to them with valve plates 111 and 112 sandwiched therebetween. Each of the end housing members 109 and 110 is formed therein with a suction chamber 113 which is communicated with the suction passages 108 through suction side communicating holes (not shown) formed in the associated valve plate 111 or 112. Each of the end housing members 109 and 110 is further formed therein with a discharge chamber 114 disposed radially inwardly of the suction chamber 113 and opposing to the cylinders 107a to 107e. These discharge chambers 114 are communicated with discharge passages 114a (see FIG. 9) in the housing members 105 and 106 through discharge side communication holes (not shown) formed in respective valve plates 111 and 112. Between the valve plates 111 and 112 and the associated housing members 105 and 106, disposed are disc-shaped resilient metallic plates made of a resilient metallic material such as spring steel. Each of the resilient metallic plates 115 and 116 is provided, at its portions opposing to the cylinders 107a to 107d, with U-shaped cuts (not shown) to suction valves. The housing members 105 and 106, the end housing members 109 and 110 and the valve plates 111 and 112 are assembled and secured together by means of tie bolts 117 to form the housing of the compressor. In order to facilitate the assembling, the compressor is designed such that the tie bolts 117 extend through the suction passages 108 in the housing members 105 and 106.

The shaft 101 is rotatably supported by radial bearings 118 and 119 constituted by ordinary needle bearings having outer races fixed to the housing members 105 and 106. Thrust bearings 120 and 121 are disposed between the central portion of the housing member 105 and the swash plate 102 and between the swash plate 102 and the central portion of the housing member 106, respectively, and are adapted to bear against the axial thrust force acting on the swash plate 102, i.e., the reactional force which is generated when the swash plate reciprocally drives each piston in the axial direction. A shaft seal 122 is disposed in one of the end housing members 109 disposed adjacent to the electromagnetic clutch 13 and is adapted to provide a tight seal between this end housing member 109 and the shaft 101 to prevent leakage of the refrigerant gas and the lubrication oil from the compressor.

Figure 8:
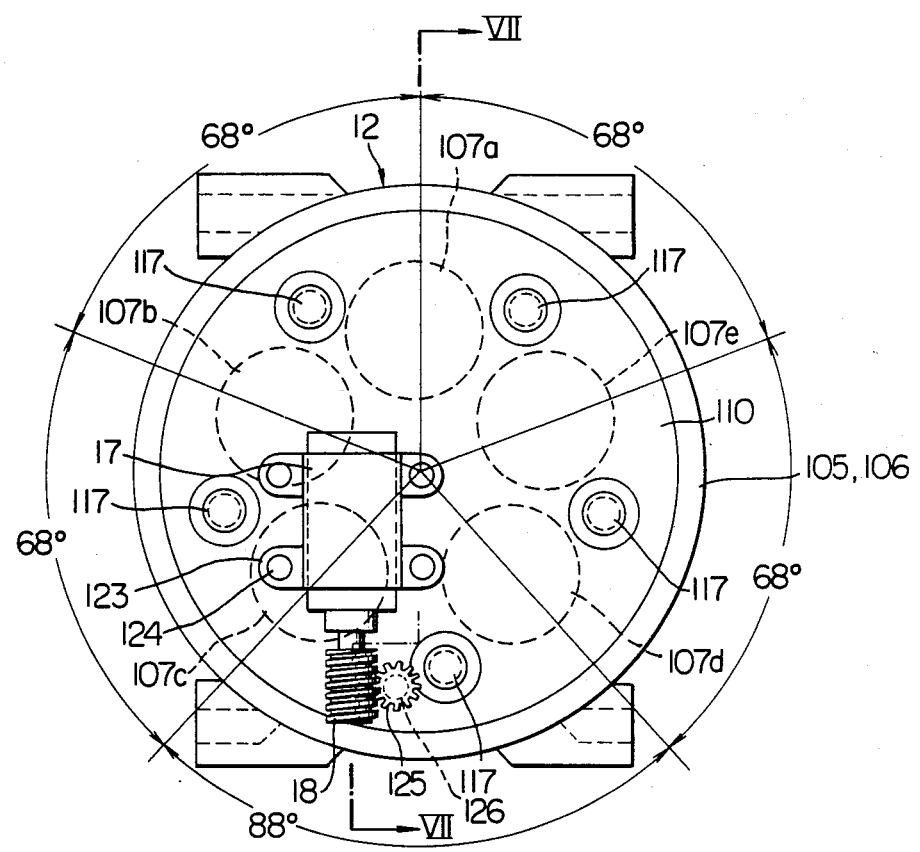
FIG. 8 is an end view of the compressor shown in FIG. 7.

Referring now to FIG. 8, a support 123 for the servo motor 17 is fixed by means of screws 124 to the end housing member 110 remote from the electromagnetic clutch 13. The worm gear 18 of the servo motor 17 is drivingly connected to an operation shaft 126 through a worm gear 125. The operation shaft 126 is positioned between the lowermost cylinders 107a and 107d and axially extends through the two valve plates 111 and 112. Spur gears 127 and 128 are secured to the portions of the operation shaft 126 adjacent to the valve plates 111 and 112.

Rings 129 and 130 constituting the compressor capacity or displacement varying members are arranged concentrically with the drive shaft 101 of the compressor and disposed within cylindrical spaces formed in the housing members 105 and 106 radially outwardly of the cylinders 107a to 107e. The displacement varying rings 129 and 130 are provided with internal teeth 129a and 130a which engage the spur gears 127 and 128 on the operation shaft 126 so that the torque of the operation shaft 126 is transmitted to the displacement varying rings 129 and 130 to rotate them.

Two generally radial by-pass holes 131a and 131b are formed in the portion of the wall of each cylinder adjacent to each displacement varying ring. Circumferential by-pass grooves 132a and 132b are formed in the inner peripheral surfaces of the displacement varying 129 and 130. Axial by-pass grooves 133 are also formed in the displacement varying rings 129 and 130 so as to extend in parallel with the shaft 101. Annular by-pass grooves 134 are formed in the axially inner end portions of the inner peripheral surfaces of the displacement varying rings 129 and 130 and extend over the entire circumference of the rings 129 and 130. By-pass ports 135 are formed in the housing members 105 and 106. The arrangement is such that the by-pass holes 131a and 131b are open to the cylinders 107a to 107e and are adapted to be communicated with the by-pass ports 135 through the by-pass grooves 132a and 132b, the by-pass grooves 133 and the by-pass grooves 134. The by-pass ports 135 further lead to the suction passages 108 formed in the housing members 105 and 106.

In the illustrated embodiment, the positions of the by-pass holes 131a and 132b formed in the wall of each cylinder are so selected as to divide the cylinder chamber on each side of the associated piston into three sections of substantially equal volume. The arrangement is such that the displacement varying rings 129 and 130 are rotatable to take a first position in which they permit only the by-pass holes 131b adjacent to the axial center of the compressor to be communicated with the corresponding by-pass grooves 132b and a second position in which the rings 129 and 130 permit both of the by-pass holes 131a and 131b to be communicated with the corresponding by-pass grooves 132a and 132b, as will be seen in FIGS. 10 and 11.

The combination of the by-pass grooves 132a and 132b is provided for each of the cylinders 107a to 107e. The by-pass grooves 132a and 132b for different cylinders, however, have different lengths in the circumferential direction of the displacment varying rings 129 and 130 (see FIG. 12) so that the number of cylinders communicating with the suction passages 108 varies depending on the rotation or angular position of the displacement varying rings 129 and 130. More specifically, all of the 20 (twenty) by-pass holes 131a and 131b directly oppose to the by-pass grooves 133 in the displacement varying rings 129 and 130 when the angle of rotation of the displacement varying rings 129 and 130 is 0° (initial position). In consequence, all by-pass holes 131a and 131b are communicated with the suction passages 108 through the by-pass grooves 133, the by-pass grooves 134 and through the by-pass ports 135 in the housing members 105 and 106. In this state, the effective or net volume of the compressor is minimum. When the displacement varying rings 129 and 130 take positions rotated by 4° from the initial position mentioned above, only the by-pass holes 131a communicating with the cylinder 107e fail to communicate with the associated by-pass grooves 132a and all of the other by-pass holes 131a and 131b are held in communication with the suction passages 108. As the angle of rotation of the displacement varying rings is increased stepwise to 8° and then to 12° at an angular interval of 4°, the number of the by-pass holes failing to communicate with the suction passages 108 is progressively increased one by one. Thus, when the displacement varying rings 129 and 130 take positions rotated by 36° from the intial 0° position, only the by-pass holes 131b open to the cylinder 107a are communicated with the suction passages 108 though the by-pass grooves 132b while all of the other by-pass holes are isolated from the suction passages. When the displacement varying rings 129 and 130 take positions rotated 40° from the initial 0° position, all of the by-pass holes 131a and 131b in the compressor are blocked, so that the net cylinder volume of the compressor takes the maximum value.

Figure 13:
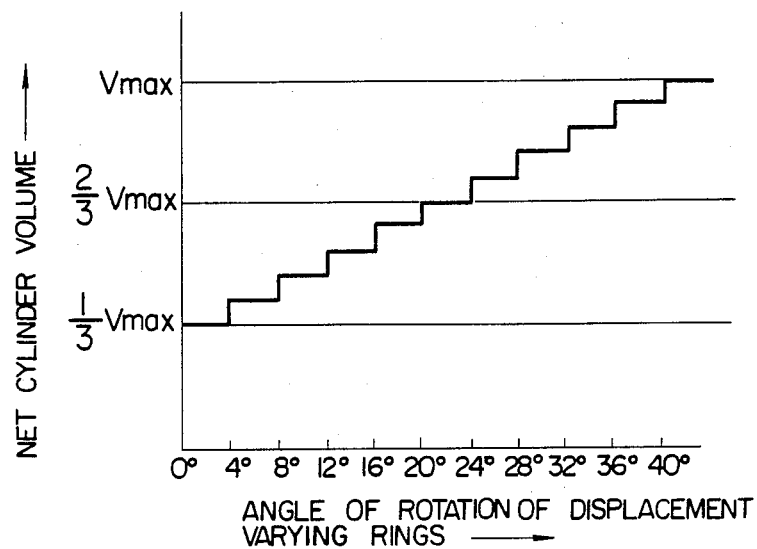
FIG. 13 graphically illustrates the relationship between the angle of rotation of the displacement varying rings and the effective or net cylinder volume or displacement of each cylinder.

The relationship between the net cylinder volume of the compressor and the rotational positions of the displacement varying rings 129 and 130 will be clearly seen in FIG. 13. It will be understood that the net cylinder volume of the compressor is varied by 10 stages between the maximum value Vmax and the minimum value which amounts to one third (⅓) of Vmax.

The portion of the end housing member 110 at which the servo motor 17 is mounted thereon is recessed to accommodate the servo motor 17 thereby to reliably hold the servo motor 17 and the associated parts as well as to minimize the amount of axial projection of the servo motor from the plane of the outer surface of the end housing member 110. Although not shown, a suitable cover member is attached to the outer surface of the end housing member 110 to keep dusts and other contaminants away from the servo motor 17 and the worms 18 and 125.

The operation of the swash plate type compressor 12 will be described hereunder. As the electromagnetic clutch is engaged, the shaft 101 starts to rotate together with the swash plate 102. The refrigerant gas evaporated in the evaporator 5 is introduced into the suction passages 108 through suction holes (not shown) formed in the housing members 105 and 106 and then into the suction chambers 113 in both end housing members 109 and 110 through the suction communication holes (not shown) formed in respective valve plates 111 and 112. As the swash plate 102 rotates, the pistons 104 are reciprocally moved in respective cylinders 107a to 107e. In consequence, the refrigerant is introduced into a cylinder when in its suction stroke through the suction hole in the valve plate 111 or 112 and then through the suction valve formed in the resilient metallic plate 115 or 116. When the piston in the cylinder is turned to the compression stroke, the suction valve of the cylinder is closed so that the refrigerant gas in this cylinder is compsressed by the piston and is discharged into the discharge chamber 114 in the end housing member 109 or 110 through the discharge hole formed in the valve plate 111 or 112 and through the discharge valve. The compressed refrigerant gas is then discharged into the dischrge passage chamber 114a in the housing member 105 or 106 through the discharge communication hole formed in the valve plate 111 or 112 and is delivered to the condenser 2 of the refrigeration cycle through a discharge port (not shown) formed in each of the housing members 105 and 106.

During the operation of the compressor, the rotational speed of the shaft 101 varies in accordance with the variation in the speed of the engine, so that the displacement of the refrigerant gas from the compressor is also changed in accordance with the change in the engine speed. Thus, the displacement may exceed the demand by the refrigeration cycle particularly when the engine is operating at a high speed. It is to be noted, however, that the refrigeration system of the described embodiment is responsive to any variation in the demand to reduce the displacement of the compressor 12.

The control of the displacement of the compressor 12 in relation to the demand by the refrigeration cycle is achieved in a manner described hereinunder.

Figure 12:
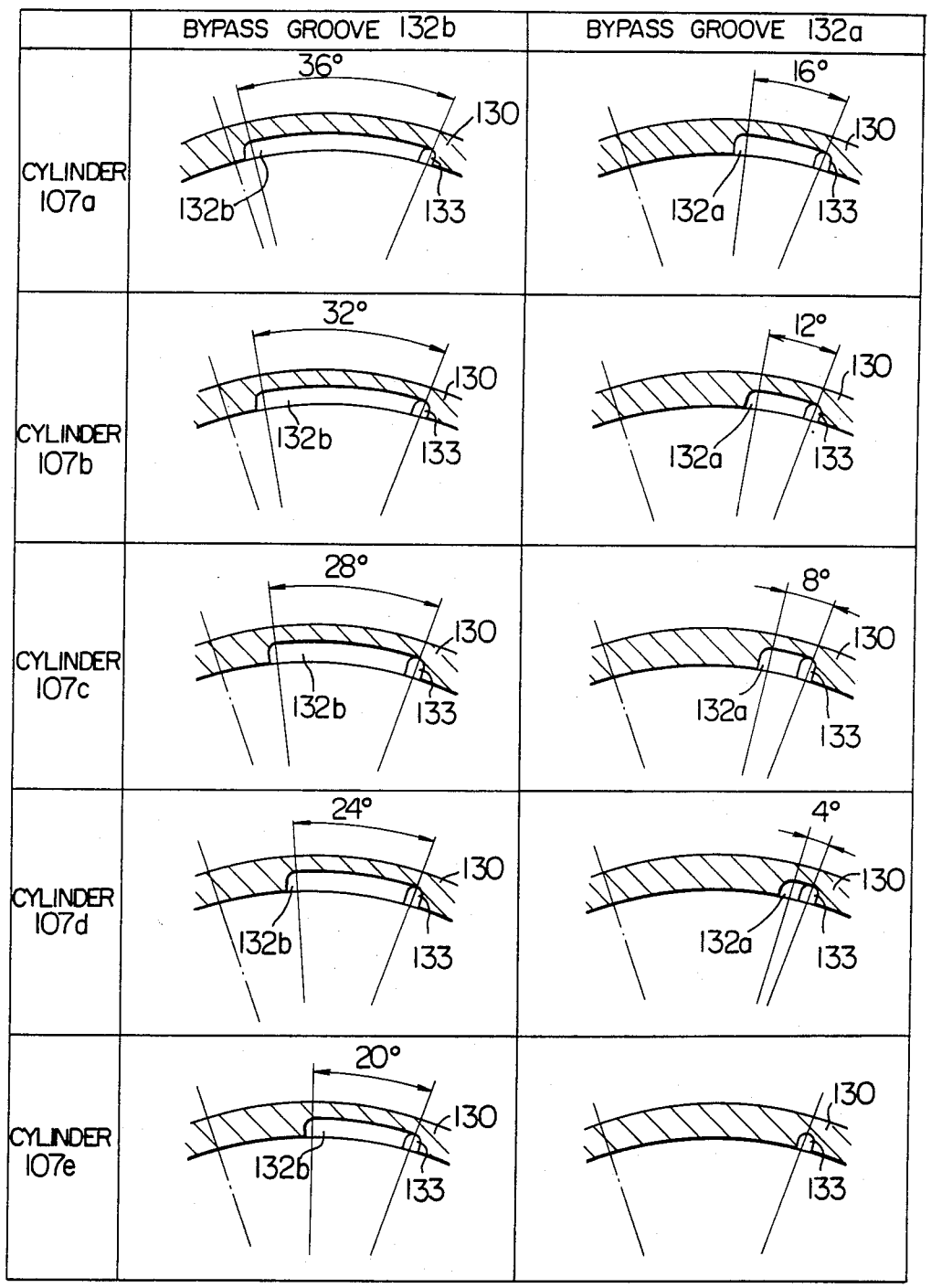
FIG. 12 is an illustrative table showing the shapes of bypass grooves associated with respective cylinders in the compressor.

As explained before, the air temperature immediately downstream of the evaporator 5 is detected by the temperature detector 14 the output of which is compared with the output of the pre-set resistor 15. When the detected air temperature becomes higher than the temperature pre-set by the pre-set resistor 15, the resistance $R_{14}$ of the thermistor constituting the temperature detector 14 becomes lower that the resistance $R_{15}$ of the pre-set resistor 15. Referring back to FIG. 6, when the resistance $R_{14}$ is decreased to a level lower than a value which is equal to $R_{15}$ minus Rc, i.e., $R_{14} < R_{15} - Rc$, the level of the output 162a of the second comparator 162 is inversed from "High" level to "Low" level to switch the transistor 165 off. In consequence, the transistors 168, 169 and 170 are switched on. At this time, the output 161a of the first comparator 161 takes the "Low" level as will be seen in FIG. 6, so that the transistor 164a takes the "off" state while the transistor 164b takes the "on" state. In consequence, the transistors 166, 167 and 171 are switched off. As a result, the servo motor 17 is supplied with electric current through the emitter and collector of the transistor 170 and the collector and emitter of the transistor 169, so that the shaft of the servo motor is rotated in the normal or forward direction to rotate the displacement varying rings 129 and 130 in the clockwise direction, as viewed in FIG. 9, via the worm gear 125, the operation shaft 126 and the spur gears 127 and 128. Thus, the angle of rotation of the displacement varying rings 129 and 130 as shown in FIG. 12 is increased to increase the net cylinder volume of the compressor. In consequence, the displacement of the compressor is increased, so that the air temperature just downstream of the evaporator 5 is gradually lowered to gradually increase the resistance $R_{14}$ of the temperature detector 14. When the resistance $R_{14}$ exceeds the resistance $R_{15}$ of the pre-set resistor 15, the output 162a of the second comparator 162 comes to take the "High" level so that the transistor 165 is switched on to switch off the transistors 168, 169 and 170. At this time, the output 161a of the first comparator still takes the "Low" level, so that the transistors 166, 167 and 171 continue to take the "off" states. Consequently, the electric power supply to the servo motor 17 is interrupted to stop the rotation thereof to fix the rotational positions of the displacement varying rings 129 and 130, thereby to set the displacement of the compressor at the level which matches with the demand by the refrigeration cycle.

To the contrary, when the air temperature just downstream of the evaporator is lowered due to various reasons such as reduction in the cooling load (reduction in the air temperature upstream of the evaporator), increase of the engine speed or the like, the resistance $R_{14}$ of the thermistor constituting the air temperature detector 14 is increased beyond the sum of the resistance $R_{15}$ set by the pre-set resistor 15 and the resistance $R_{163}$ set by the variable resistor 163 (i.e., $R_{14} > R_{15} + R_{163}$), the output 161a of the first comparator 161 is changed from "Low" level to "High" level, so that the transistor 164a is switched on while the transistor 164b is switched off, thereby to switch on the transistors 166, 167 and 171. Consequently, the servo motor 17 is supplied with electric current in the direction opposite to that mentioned before, i.e., through the emitter and collector of the transistor 171 and the collector and emitter of the transistor 167, so that the shaft of the servo motor 17 is reserved to rotate the displacement varying rings 129 and 130 in the counter-clockwise direction, as viewed in FIG. 9, via the action of the worm gears 18 and 25, operation shaft 126 and the spur gears 127 and 128. This means that the angle of rotation of the displacement varying members as shown in FIG. 12 is decreased, so that the displacement of the compressor is decreased correspondingly. As a result, the air temperature just downstream of the evaporator 5 is increased to decrease the resistance $R_{14}$ of the temperature detector 14 down to a level which is smaller than a value expressed by $(R_{15} + R_{163}) - Rc$, i.e., $R_{14} < (R_{15} + R_{163}) - Rc$. Thus, the output 161a of the first comparator 161 comes to take the "Low" level to switch the transistor 164a off and switch the transistor 164b on, so that the transistors 166, 167 and 171 are switched off to stop the servo motor 17 again thereby to fix the rotational positions of the displacement varying rings 129 and 130.

As described, according to the invention, the displacement of the compressor is automatically controlled to match with the state of operation of the air conditioner to optimize the refrigerating capacity. When the temperature of air detected by the temperature detector 14 falls within a predetermined temperature range which corresponds to the resistance $R_{163}$ of the resistor 163 in the illustrated embodiment (see FIG. 6), the electric power supply to the servo motor 17 is stopped to stationarily hold the displacement varying rings 129 and 130 to permit the compressor to operate at a constant displacement.

In order to adjust the air temperature just downstream of the evaporator 5 to avoid the undesirable frosting on the evaporator, it is advisable to control the displacement of the compressor such that this air temperature falls between 3° C. and 5° C.

It is advisable to set a range of temperature as discussed in that, during the time period while the air temperature just downstream of the evaporator 5 falls within this range, the servo motor 7 can be stopped so that the undesirable hunting, i.e., frequent start and stop of the servo motor, is eliminated to shorten the working time of the servo motor even when the cooling demand and/or the engine speed is changed frequently, thereby to improve the durability of the servo motor. It is also to be noted that the above-mentioned predetermined range of set temperature is variable by the variable resistor 163 in accordance with various factors such as the amplitude of the variation of the cooling load.

Furthermore, since the temperature control is achieved by the minute control of the displacement of the compressor, it is possible to maintain the compressor 12 in operative state continuously over a wide range of operation of the air conditioner without requiring frequent engagement and disengagement of the electromagnetic clutch 13. In consequence, it is possible to increase the operative lives of the clutch 13 and the compressor 12 as well as to eliminate deterioration of the driving feeling. It is also possible to prevent the unpleasant feeling of overcooling or overheating of air attributable to the delay of operation of the electromagnetic clutch 13. Moreover, since wasteful operation of the compressor with excessive displacement can be eliminated, the air conditioner employing the refrigeration system of the invention can considerably save power and energy as a whole. In the conventional air conditioner of the type in which the cooling capacity is controlled by a frequent turning on and off of the operation of the compressor, the refrigerant in the evaporator 5 is superheated without delay after the stop of the compressor and, therefore, when the compressor is started again, the compressor is operated wastefully to remove the superheated area for a period of time until the effective cooling of air is started. In the air conditioner employing the refrigeration system of the invention, however, the refrigerant gas is never superheated because the control of the air temperature is performed without stopping the compressor, so that the wasteful operation of the compressor is eliminated economically.

In the described embodiment, the by-pass holes 131a and 131b formed in the walls of the cylinders are communicated with the suction passages 108 through the by-pass grooves 132a and 132b, the by-pass passages 133 and the by-pass passages 134. The by-pass holes 131a and 131b, however, may be communicated with any space at a pressure lower than the pressure in the cylinders 107a to 107e, i.e., with any space which is kept at the suction pressure. For instance, it is possible to design the compressor 12 such that the by-pass holes 131a and 131b can be communicated with the suction chambers 113, crank chamber (the space in which swash plate 102 rotates) or the cylinders which are in their suction strokes. Although the swash plate type compressor of the described embodiment has 10 (ten) cylinders, the invention can be embodied with any swash plate type compressor having two or more cylinders. Needless to say, the displacement varying rings 129 and 130 may be disposed in the space between the shaft 101 and the cylinders 107a to 107e of the compressor rather than in the cylindrical spaces formed in the housing parts 105 and 106.

It is also possible to carry out the invention with a compressor of the types other than the described swash plate type, such as vane type compressor, provided that the compressor is of a variable displacement type.

The displacement varying rings 129 and 130 can be replaced by other displacement varying members depending on the type of the compressor used.

It is also possible to use a combination of a vacuum-actuated diaphragm mechanism and a link mechanism in place of the servo motor 17.

In the described embodiment, the air temperature just downstream of the evaporator is detected as an index of the rate of the cooling of the evaporator 5. This, however, is not exclusive and various factors such as surface temperature of the evaporator, refrigerant temperature in the evaporator (refrigerant temperature at the low-pressure side of the refrigeration cycle), refrigerant pressure in the evaporator (refrigerant pressure at the low-pressure side of the refrigeration cycle) and so forth.

The pre-set resistor 15 may be installed on the control panel of the air conditioner so as to be easily manipulated by the user, so that he or she can easily set the resistance value $R_{15}$ of the resistor 15. By so doing, it is possible to remote-control the room air temperature by the displacement control of the compressor.

The refrigeration system of the invention can be applied not only to the automotive air conditioners but also to other uses such as air conditioners of ordinary houses, refrigerators and so forth.

FIGS. 14 to 17 show a second embodiment of the invention in which the same reference numerals are used to denote the parts or members identical to those used in the first embodiment. The following description of the second embodiment, therefore, will be focussed to the difference from the first embodiment.

Figure 14:
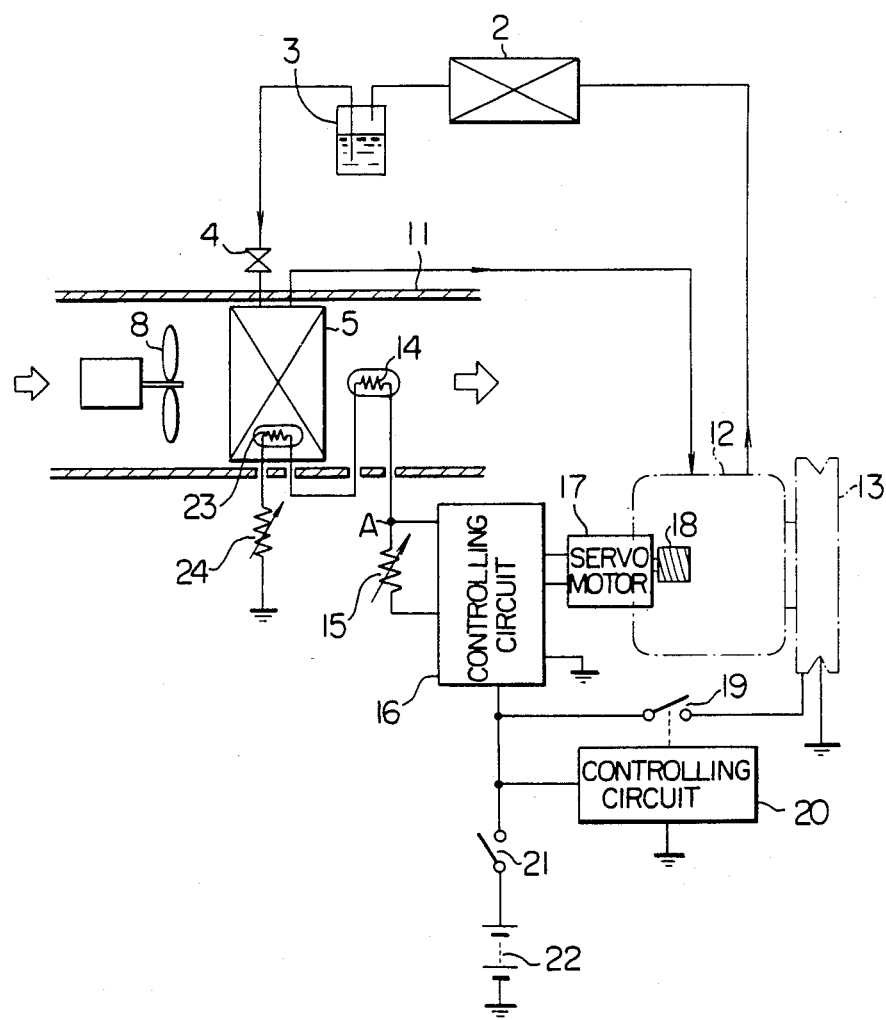
FIG. 14 is a view similar to FIG. 4 but illustrates a second embodiment of the refrigeration system according to the present invention.
Figure 15:
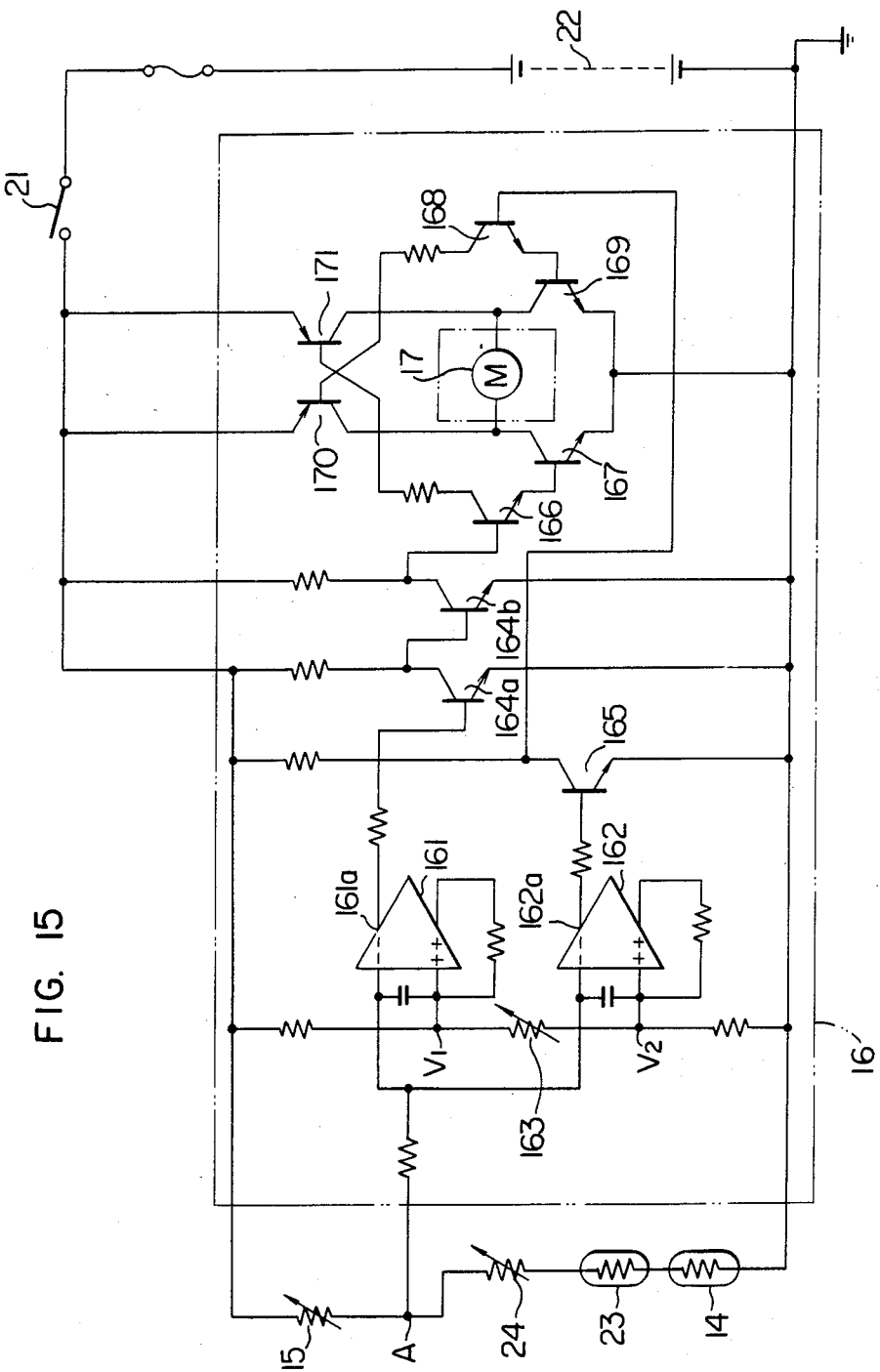
FIG. 15 is a view similar to FIG. 5 but illustrates the controlling electric circuitry of the refrigeration system shown in FIG. 14.

Referring first to FIGS. 14 and 15, the refrigeration system of the second embodiment has a second temperature detector 23 consisting of a thermistor and adapted to detect the temperature of the refrigerant flowing in the refrigerant pipe in the evaporator 5. The temperature detector 23 is disposed in the refrigerant pipe in the evaporator 5. A position detector 24 is adapted to detect the position of the displacement varying members 129 and 130 disposed in the compressor 12. The position detector 24 consists of a potentiometer operatively connected to one of the displacement varying member 129 and 130. The control circuit 16 is adapted to receive the signals from the elements 14, 15, 23 and 24. Namely, the elements 14, 23 and 24 are connected in series, and the electric potential at the point of juncture A between this series circuit and the pre-set resistor 15 is delivered to the control circuit 16.

Figure 16:
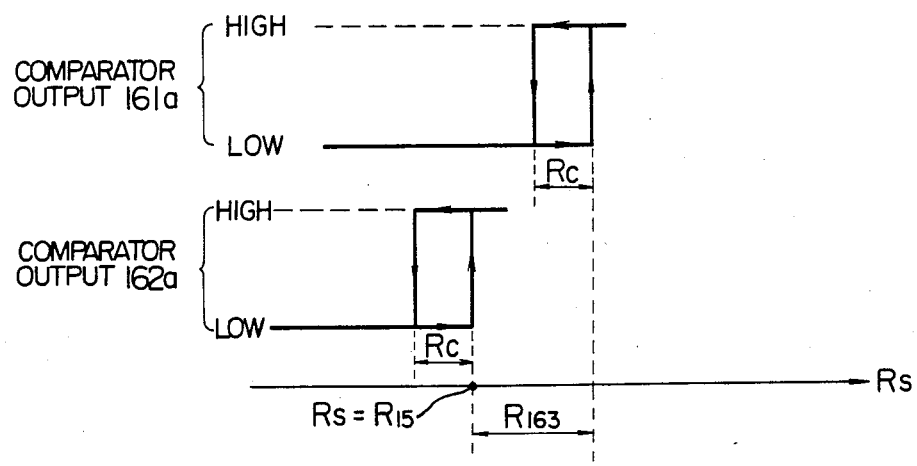
FIG. 16 illustrates the operation characteristics of the comparators of the electric circuitry shown in FIG. 15.

FIG. 16 shows the operation characteristics of the control circuit 16. The control circuit 16 is adapted to control the rotational position of the servo motor 17 such that a balance is obtained between the resistance value $R_{15}$ of the pre-set resistor 15 and the sum Rs of the resistances of the resistance $R_{14}$ of the thermistor constituting the temperature detector 14, the resistance $R_{23}$ of the thermistor constituting the temperature detector 23 and the resistance $R_{24}$ of the potentiometer constituting the position detector 24.

The arrangement is such that the output 161a of the first comparator 161 is changed from "Low" level to "High" level when the sum Rs of the series resistances comes to take a value greater than the resistance $R_{15}$ of the pre-set resistor 15 by a resistance $R_{163}$ set by the variable resistance 163, i.e., when $Rs > R_{15} + R_{163}$. To the contrary, the output 161a is changed from the "High" level to the "Low" level when the sum Rs of the series resistances comes down to a level which is lower than the total of resistances $R_{15}$ plus $R_{163}$ by a constant value Rc, i.e., when $Rs < (R_{15} + R_{163}) - Rc$.

On the other hand, the second comparator 162 has an output 162a which is inverted from "Low" level to "High" level at the moment at which Rs is equal to $R_{15}$. To the contrary, the output 162a is inverted from the "High" level to the "Low" level when the sum Rs of series resistances is decreased to a level which is lower than the resistance $R_{15}$ by the predetermined resistance Rc, i.e., when $Rs < R_{15} - Rc$. The resistance Rc is a predetermined resistance range determined by the hysteresis characteristics of the first and second comparators 161 and 162, as discussed previously.

Figure 17:
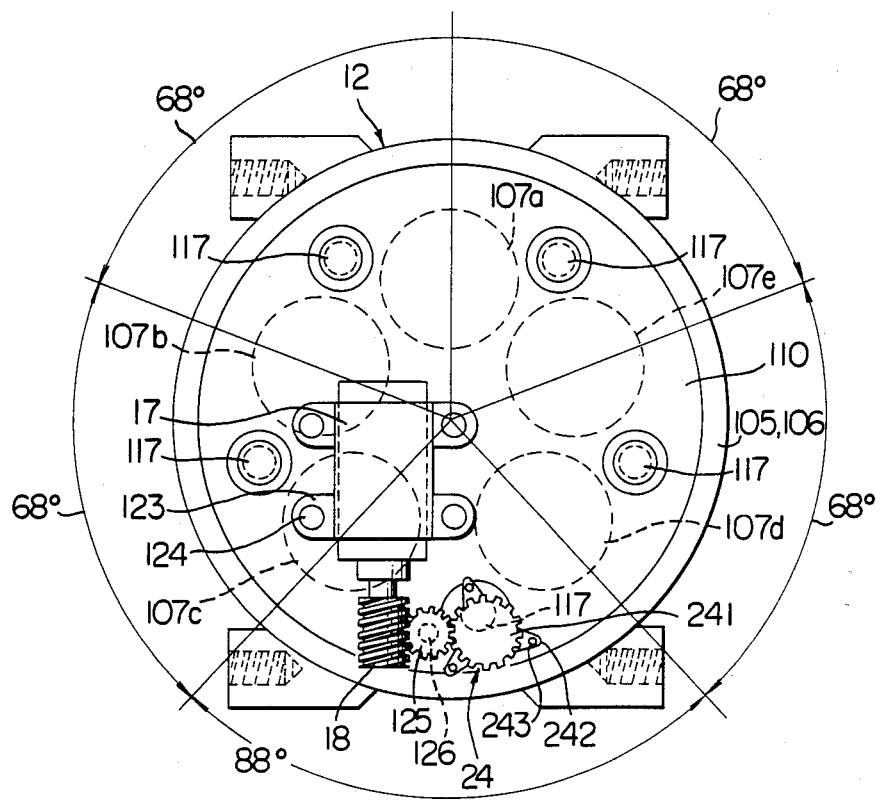
FIG. 17 is an end view of a modified compressor of the refrigeration system shown in FIG. 14.

The rotational position of the displacement varying rings 129 and 130 is detected by the potentiometer constituting the position detector 24 which will emit an electric signal. Namely, as shown in FIG. 17, the worm gear 125 provided on one end of the operation shaft 126 meshes also with a drive gear 241 of the position detector 24, so that the resistance value of the potentiometer constituting the position detector 24 is varied in accordance with the rotation of the worm gear 125, i.e., the rotation of the operation shaft 125. In consequence, the position detector 24 provides an electric signal corresponding to the position of the displacement varying rings 129 and 130. The position detector 24 is secured by means of screws 243 and a stay 242 to the end housing member 110. The portions of the outer surface of the end housing member 110 at which the position detector 24 and the servo motor 17 are secured to the end housing member 110 are recessed to accomodate the position detector and the servo motor and to reduce the amounts of projection of these components from the end face of the end housing member 110. A suitable cover member (not shown) may be secured to the end housing member so as to keep dust and other contaminants away from the servo motor 17, the worm gears 18 and 125 and the position detector 24.

The rotational position of the displacement varying rings 129 and 130 is continuously detected by the position detector 24 whose output is fed back to the controlling circuit 16, so that any overshoot, i.e., any excessive rotation of the displacement varying rings 129 and 130 can be avoided advantageously, thereby to eliminate the hunting of operation of the servo motor 17 and the displacement varying rings 129 and 130. In consequence, the overshoot and undershoot of the evaporator temperature control can be minimized.

In the case where this refrigeration system is applied to an automotive air conditioner, the compressor 12 is driven by the automobile engine, so that the operation speed of the compressor 12 is widely varied according to variation in the automobile operation. In addition, the condensation capacity of the condenser for liquefying the gaseous refrigerant is largely varied with various states of the automobile operation because the condenser is usually so installed as to be cooled by the cooling air flow produced by the ram pressure generated as a result of running of the automobile. Thus, the state of running of the automobile can be considered as a disturbance factor of the automatic control of the evaporator temperature. The variation in the refrigerant flow rate due to change in the operation speed of the compressor and the variation in the condensation capacity of the condenser are closely related to the refrigerant temperature in the evaporator. This knowledge is taken into this embodiment; Namely, the regfrigerant temperature in the evaporator is detected by the temperature detector 23 which emits its output to the control circuit 16 which is operative to control the system such that the displacement of the compressor is set to match with the refrigerant temperature in the evaporator. By so doing, it is possible to stabilize the control of the displacement of the compressor 12 to eliminate unnecessary frequent changes of the positions of the displacement varying rings 129 and 130 to thereby ensure a smooth control of the evaporator temperature.

Figure 20:
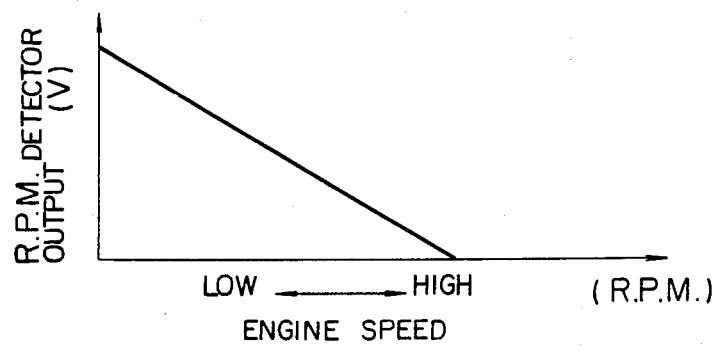
FIG. 20 graphically illustrates the output voltage of the engine R.P.M. detector shown in FIG. 18 with respect to the engine speed.
Figure 18:
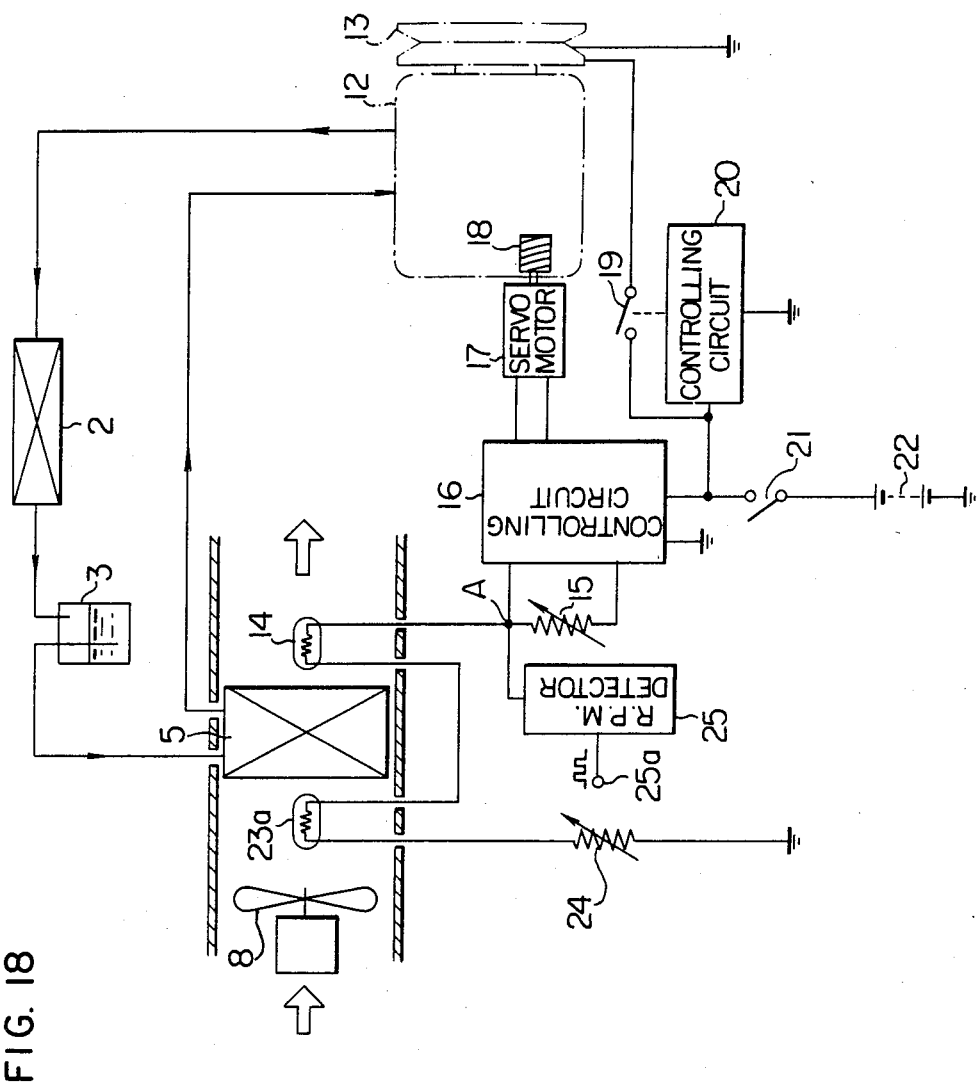
FIG. 18 is a view similar to FIGS. 4 and 14 but illustrates a third embodiment of the refrigeration system according to the present invention.
Figure 19:
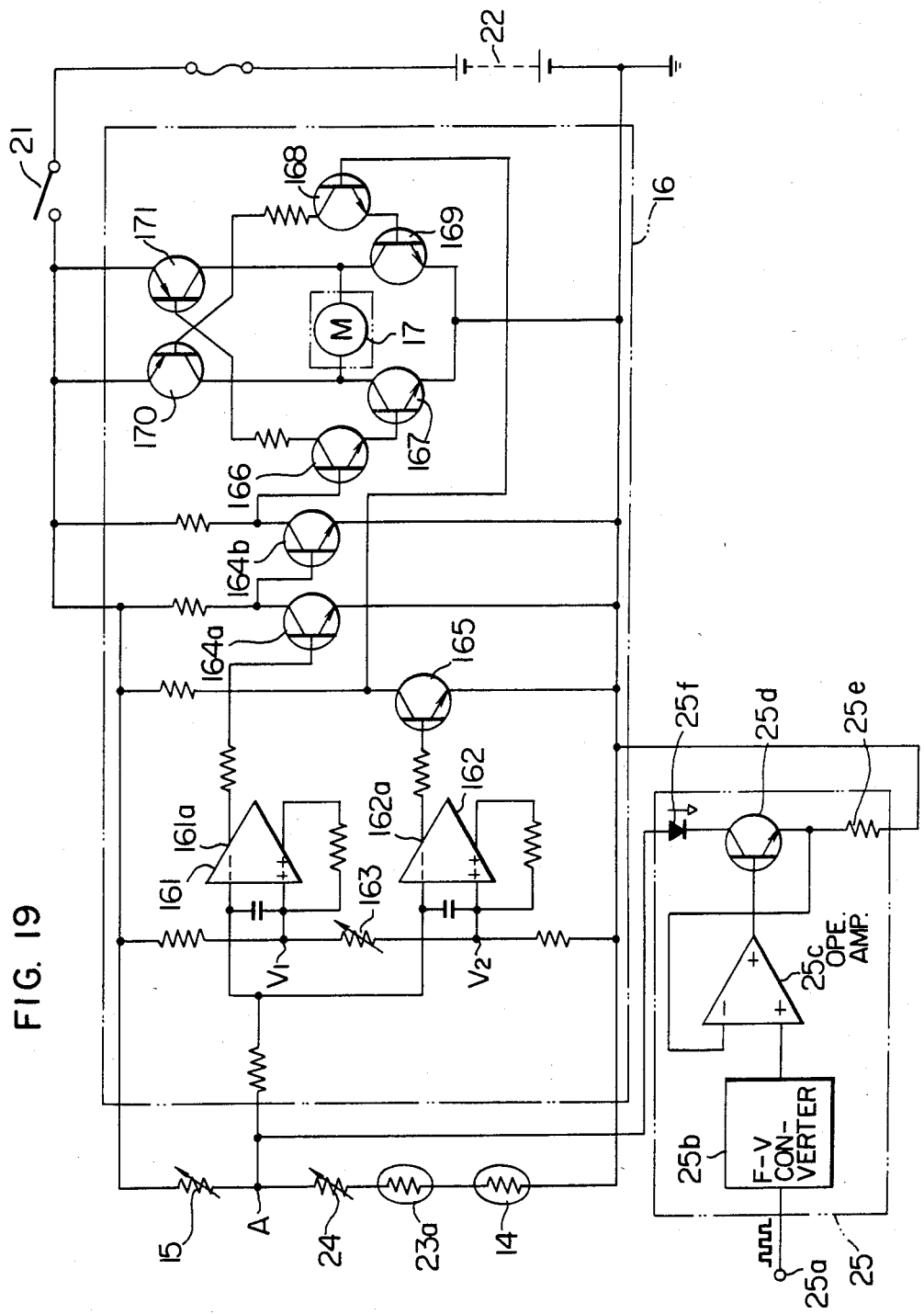
FIG. 19 is a view similar to FIGS. 5 and 15 but illustrates the controlling electric circuitry of the refrigeration system shown in FIG. 18.

FIGS. 18 to 20 show a third embodiment of the invention, in which the same reference numerals are used to denote the parts or members identical to those of the preceding embodiments. The following description of the third embodiment, therefore, will be focussed mainly on the difference from the preceding embodiments.

A temperature detector 23a consisting of a thermistor is adapted to detect the air temperature just upstream of the evaporator 5, while a revolution speed (R.P.M.) detector 25 is provided to detect the revolution speed of the automobile engine by which the compressor 12 is driven. Namely, the revolution speed detector 25 has an input terminal 25a adapted to receive a pulse signal of a frequency corresponding to the engine speed, e.g., the pulse signal available at the primary coil of the engine ignition system.

The control circuit 16 is adapted to receive signals from the detectors 14, 15, 23a, 24 and 25. Namely, the detectors 14, 23a and 24 are connected in series, and this series circuit and the pre-set resistor 15 are connected at a juncture A to which the revolution speed detector 25 is also connected. The potential at the point of juncture A is fed into the control circuit 16.

The revolution speed detector 25 is provided with an F-V converter circuit (Frequency-to-voltage converter circuit) 25b, as shown in FIG. 19. The F-V converter circuit 25b is designed to produce a voltage signal the level of which is decreased as the engine speed is increased. The output from the F-V converter circuit is transformed into the level of the collector current of a transistor 25b by the operation of a voltage-current converter circuit consisting of an operation amplifier 25c, the transistor 25d, a resistor 25e and a diode 25f. Namely, the operation amplifier 25c operates to equalize the output voltage from the F-V converter circuit 25b to the emitter voltage of the transistor 25d, so that the collector current in the transistor 25d is increased as the engine speed is lowered and vice versa.

The operation of the control circuit 16 shown in FIG. 19 is similar to that shown in FIG. 16 and thus is not described here.

In the automotive air conditioner in which the compressor 12 is driven by the automobile engine, the operation speed of the compressor 12 is largely varied with the change in the state or condition of the automobile operation, with a resultant variation in the flow rate of the refrigerant circulated through the refrigeration cycle. According to the described third embodiment of the invention, the variation in the engine speed is also utilized for the control of displacement of the compressor. Namely, the engine speed is detected by the revolution speed detector 25 which emits an output signal to the control circuit 16. The output current from the revolution speed detector 25 is increased and decreased as the engine speed is decreased and increased, respectively. In consequence, the potential at the point A is lowered as the engine speed is decreased, as in the case of the reduction in the sum Rs of the series resistances of the preceding embodiment, so that the displacement of the compressor is increased. To the contrary, as the engine speed is increased, the potential at the point A is increased, as in the case of the increase in the sum Rs of the series resistances, so that the displacement of the compressor is decreased. As such, the utilization of the change in the engine speed is effective to stabilize the control of displacement of the compressor, namely, to eliminate the undesirable frequent operation of the displacement varying rings 129 and 130 thereby to facilitate a smooth control of the evaporator temperature.

Figure 21:
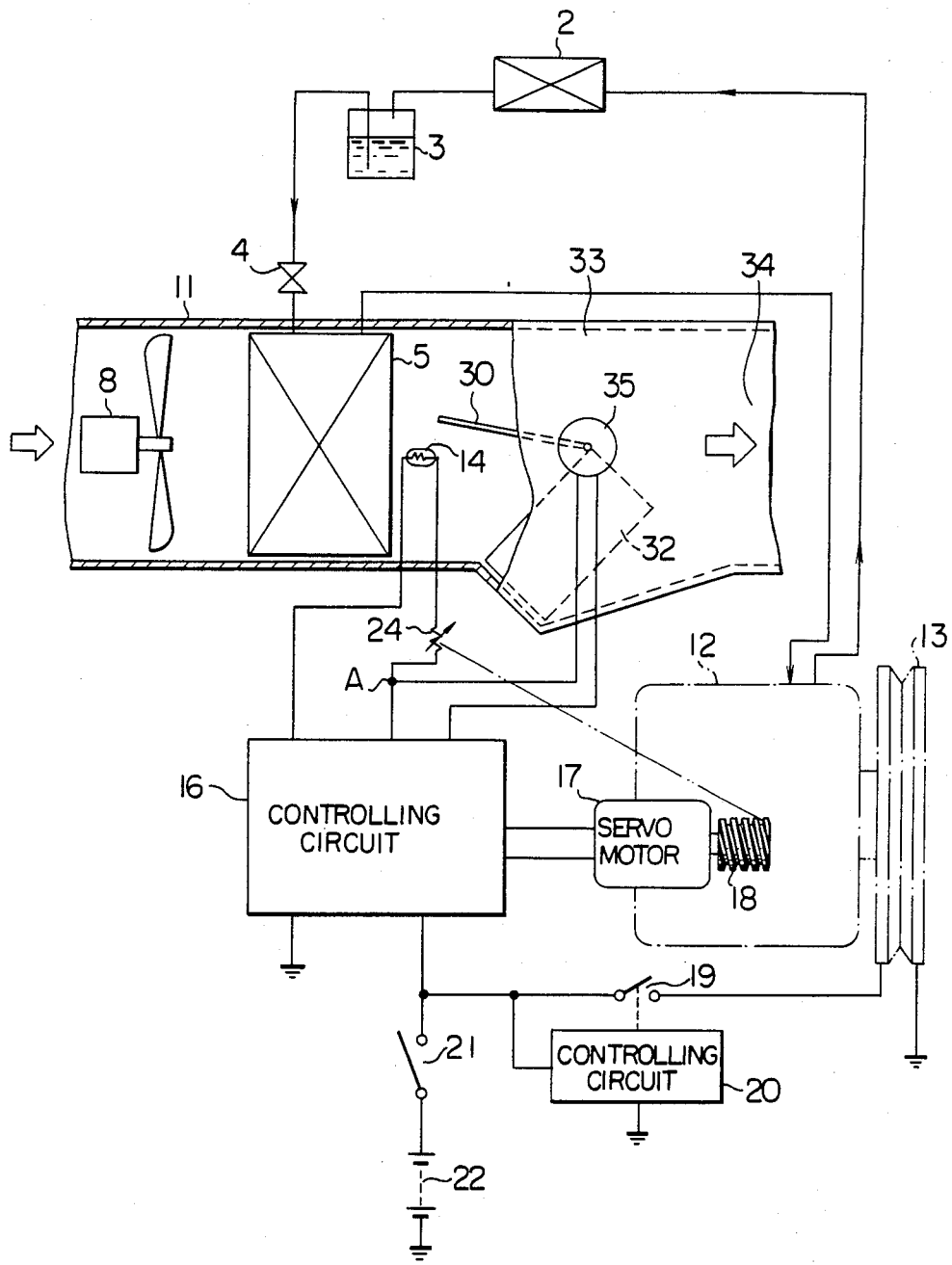
FIG. 21 is a view similar to FIGS. 4, 14 and 18 but illustrates a fourth embodiment of the refrigeration system according to the present invention.
Figure 22:
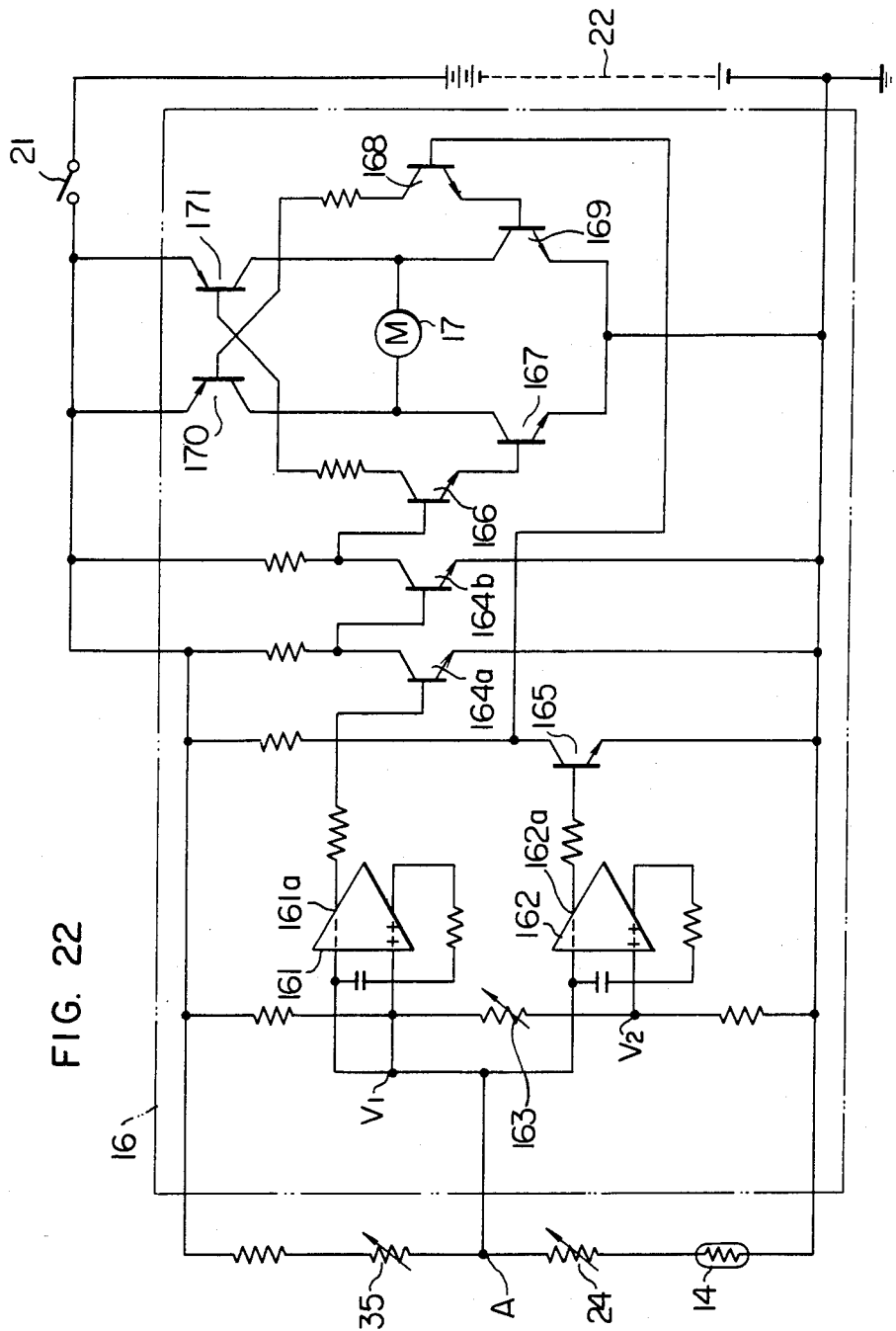
FIG. 22 is a view similar to FIGS. 5, 15 and 19 but illustrates the controlling electric circuitry of the refrigeration system shown in FIG. 21.

FIGS. 21 and 22 show a fourth embodiment of the invention, in which the same reference numerals are used to denote the parts or members identical to those of the preceding embodiments. The explanation of the fourth embodiment, therefore, will be focussed mainly on the difference from the preceding embodiments.

An automotive air conditioner includes an air mix damper 30 and a heater 32 disposed in the duct 11 downstream of the evaporator 5. The heater 32 is adapted to heat the air by the heat derived from the cooling water circulated in the engine and is disposed in the close proximity of the bottom wall of the duct 11. A by-pass passage 33 is defined between the heater 32 and the upper wall of the duct 11. An air mixing chamber 34 is formed in the duct 11 downstream of the by-pass passage 33 and the heater 32. The warmed air from the heater 32 and the cooled air from the by-pass passage 33 are mixed in the air mixing chamber 34 to form an air of a desired temperature which is then supplied through a mode-switching damper and ventilators to the passenger compartment.

The air mix damper 30 is connected to a temperature control lever on the air conditioner control panel through a suitable linkage mechanism such as a cable wire, so that the damper can be manually operated by the driver. This, however, is not exclusive and the air mix damper 30 may be controlled automatically by an automatic temperature controlling mechanism.

The position or opening of the air mix damper 30 is detected by a position detector 35 consisting of a potentiometer operatively associated with the air mix damper 30. The control circuit 16 is adapted to receive signals from the above-mentioned elements 14, 24 and 35. More specifically, the elements 14 and 24 are connected in series and the position detector 35 is connected at a point A to this series circuit. The potential at this point A is fed to the control circuit 16.

The position detector 35 acts as a pre-set resistor for determining a pre-set temperature of air immediately downsteam of the evaporator 5 in accordance with the opening of the air mix damper 30. Namely, the resistance $R_{35}$ of the potentiometer takes the maximum value when the air mix damper 30 takes the minimum opening position, i.,e., when the air passage to the heater 32 is completely closed and the by-pass passage 33 is fully opened to provide the maximum cooling rate. In consequence, the displacement of the compressor is maximized by the operation of the control circuit 16 explained before and the air temperature immediately downstream of the evaporator 5 is set at the lowest possible level which prevents frosting on the evaporator fins, e.g., 3° to 4° C., whereby the capacity of the refrigeration cycle can be fully utilized.

When the opening of the air mix damper 30 is increased, i.e., when the room temperature desired by the occupant is raised, the resistance of the potentiometer of the position detector 35 is lowered to decrease the displacement of the compressor correspondingly. In consequence, the air temperature immediately downstream of the evaporator 5 is reset at an elevated or higher level. In the fourth embodiment described, it is thus possible to decrease the displacement of the compressor in accordance with the increase of the opening of the air mix damper 30, so that any wasteful cooling of air by the evaporator 5 can be avoided to save the energy required to drive the compressor.

What is claimed is:

1. An air conditioning system comprising:
   a duct defining therein an air passage having a downstream end open to a chamber to be air-conditioned;
   a refrigeration system including:
   a variable capacity refrigerant compressor including means for varying the displacement of said compressor and means for driving said compressor displacement varying means; and an evaporator disposed in said air passage and being in fluid-flow communication with the intake side of said compressor;
   means for causing air to flow through said evaporator and through said duct into said chamber;
   a heater disposed in said duct downstream of said evaporator and being operative to heat at least a part of the air which has passed through said evaporator;
   means for controlling the heating of the air by said heater; and
   means for controlling the capacity of said compressor, said capacity controlling means including:
   sensor means operative to detect a condition related to the cooling operation of said evaporator and emit a first electric signal representing the condition thus detected;
   means for detecting the position of said air heating controlling means to emit a second electric signal representing the position thus detected; and
   electric circuit means operative in response to said first and second electric signals from said sensor means and from said position detecting means to actuate said driving means for thereby varying the displacement of said compressor whereby the capacity of said refrigeration system can be controlled, said electric circuit means including:

(a) means emitting a third electric signal in accordance with the ratio between said first and second electric signals;

(b) a first comparator means operative to compare said third electric signal with a first electric reference signal to emit a first electric output;

(c) a second comparator means operative to compare said third electric signal with a second electric reference signal different from said first electric reference signal to emit a second electric output;

(d) first electric actuating means responsive to said first electric output to actuate said driving means in a direction to decrease the compressor displacement; and (e) a second electric actuating means responsive to said second electric output to actuate said driving means in a direction to increase the compressor displacement.

2. An air conditioning system as claimed in claim 1, wherein said third electric signal emitting means comprises an electric connection electrically connecting said sensor means to said position detecting means in series and electrically connected to said first and second comparator means.

3. An air conditioning system comprising:
a duct defining therein an air passage having a downstream end open to a chamber to be air-conditioned;
a refrigeration system including:
a variable capacity refrigerant compressor including means for varying the displacement of said compressor; and an evaporator disposed in said air passage and being in fluid-flow communication with the intake side of said compressor;
means for causing air to flow through said evaporator and through said duct into said chamber;
a heater disposed in said duct downstream of said evaporator and being operative to heat at least a part of the air which has passed through said evaporator;
means for controlling the heating of the air by said heater; and
means for controlling the capacity of said compressor, said capacity controlling means including:
sensor means operative to detect the temperature of air downstream of said evaporator;
means for detecting the position of said air heating controlling means; and electric circuit means operative in response to signals from said sensor means and from said position detecting means to actuate said means for varying the displacement of said compressor whereby the capacity of said refrigeration system can be controlled.

4. An air conditioning system as claimed in claim 1, wherein said sensor means comprises a temperature sensor element disposed to detect the temperature of air downstream of said evaporator.

5. An air conditioning system as claimed in claim 1, wherein said sensor means comprises a temperature sensor element disposed to detect the temperature of the surface of said evaporator.

6. An air conditioning system as claimed in claim 3, wherein said sensor means comprises a pressure sensor for detecting the pressure of the refrigerant at said evaporator.

7. An air conditioning system as claimed in claim 3, wherein said air passage includes a portion bypassing said heater and said means for controlling the heating of the air comprises a valve means operative to control the ratio of the air flow from said evaporator to and through said heater to the air flow from said evaporator and through said bypassing portion.

8. An air conditioning system as claimed in claim 1, wherein said refrigeration system further includes an additional position detecting means for detecting the position of said compressor displacement varying means and emitting a signal representing said detected position, and wherein third electric signal emitting means is operative to emit said third electric signal according to the ratio of the sum of said first and additional electric signals to said second electric signal.

9. An air conditioning system as claimed in claim 8, wherein said third electric signal emitting means comprises a first electric connection electrically connecting said sensor means to said additional position detecting means in series to form a first series circuit, and a second electric connection electrically connecting said first series circuit to the first-mentioned position detecting means in series, said second electric connection being electrically connected to said first and second comparator means.

10. An air conditioning system as claimed in claim 4, wherein said refrigeration system further includes an additional position detecting means for detecting the position of said compressor displacement varying means and wherein said electric circuit means are operative also in response to a signal from said additional position detecting means.

11. An air conditioning system as claimed in claim 5, wherein said refrigeration system further includes an additional position detecting means for detecting the position of said compressor displacement varying means and wherein said electric circuit means are operative also in response to a signal from said additional position detecting means.

12. An air conditioning system as claimed in claim 6, wherein said refrigeration system further includes an additional position detecting means for detecting the position of said compressor displacement varying means and wherein said electric circuit means are operative also in response to a signal from said additional position detecting means.

13. An air conditioning system as claimed in claim 7, wherein said refrigeration system further includes an additional position detecting means for detecting the position of said compressor displacement varying means and wherein said electric circuit means are operative also in response to a signal from said additional position detecting means.

* * * * *